United States Patent

[11] 3,574,897

[72] Inventors Manning Citron
San Marino;
William R. Baynes, Palos Verdes Peninsula;
Dennis H. Merino, Harbor City, Calif.
[21] Appl. No. 809,197
[22] Filed Mar. 21, 1969
[45] Patented Apr. 13, 1971
[73] Assignee Mattel, Inc.
Hawthorne, Calif.

[54] INJECTION-MOLDING APPARATUS
10 Claims, 13 Drawing Figs.

[52] U.S. Cl. .................................... 18/30QH,
18/30HB, 18/30NY, 18/30NS, 219/301
[51] Int. Cl. ..................................... B29f 1/03,
B29f 1/06
[50] Field of Search ........................................... 18/30
(NVP), 30 (NVW), 30 (QH), 30 (HB); 249/79;
165/135

[56] References Cited
UNITED STATES PATENTS
2,010,180  8/1935  Ferranti .................... 165/135X

| 2,422,990 | 6/1947 | Spanier .................. | 18/30NVW |
|---|---|---|---|
| 2,501,012 | 3/1950 | St. Clair .................. | 165/135X |

FOREIGN PATENTS

| 767,146 | 1/1957 | Great Britain .............. | 425/243 |
|---|---|---|---|
| 877,300 | 9/1961 | Great Britain .............. | 18/30QH |
| 1,014,315 | 8/1957 | Germany .................... | 425/242 |

*Primary Examiner*—H. A. Kilby, Jr.
*Assistant Examiner*—David S. Safran
*Attorneys*—Seymour A. Scholnick and Max E. Shirk ABSTRACT: A simple injection mold machine comprising a heated cylinder that is spring biased upward, away from the mold, a valve at the bottom of the cylinder which is opened by pushing it up, and a piston for moving down in the cylinder. Downward force on the piston moves the cylinder down until the valve abuts the mold and is opened, the piston also supplying force to expel the material out of the cylinder and into the mold. The molds include wells that trap the first-injected material, which may represent the remainder from a previous charge of another color so it does not enter the cavity where useful parts are formed. The molds also include riser passageways that allow the escape of material when the cavity is filled, to indicate this fact.

Patented April 13, 1971
3,574,897
4 Sheets-Sheet 1
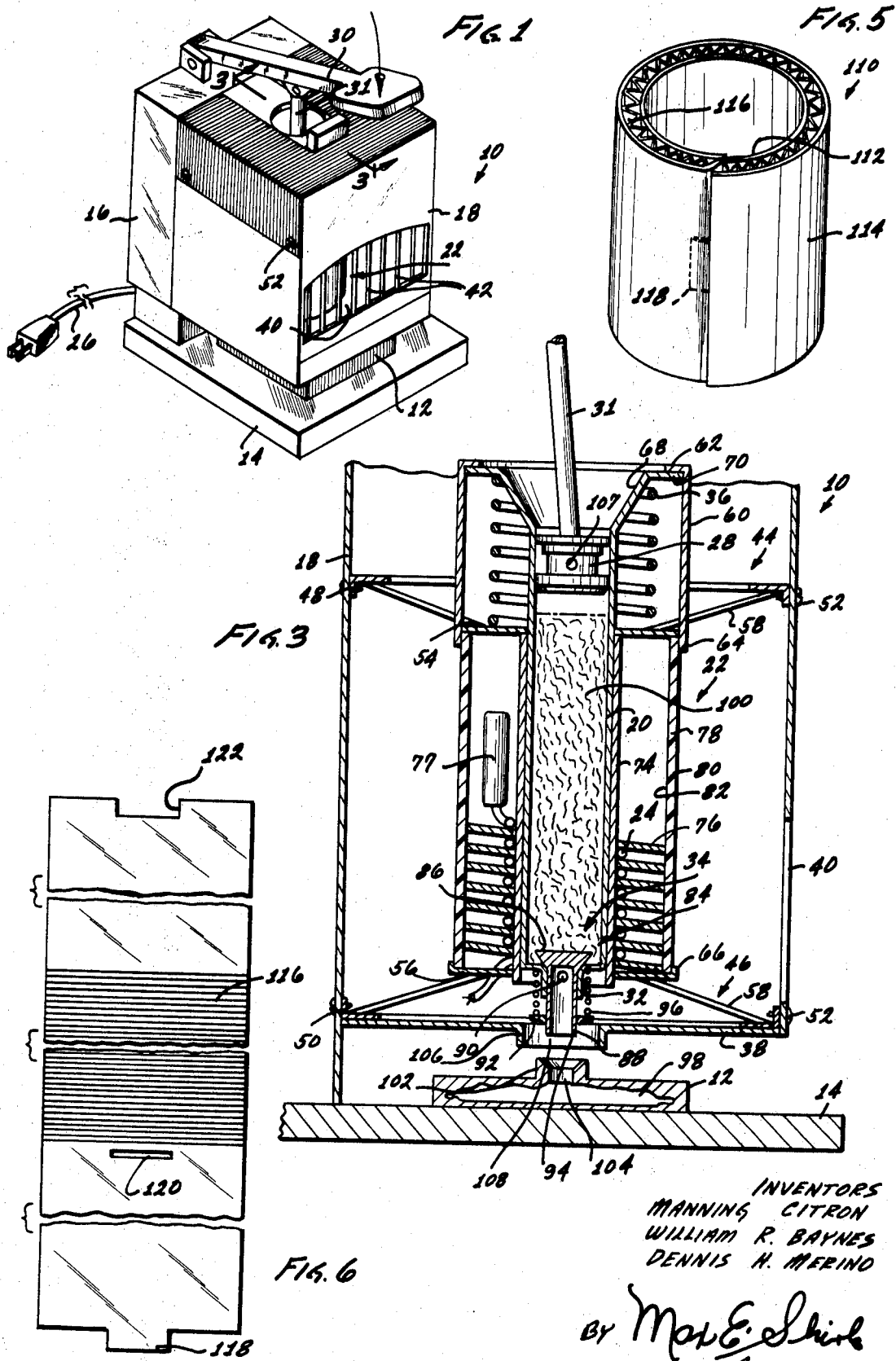
INVENTORS
MANNING CITRON
WILLIAM R. BAYNES
DENNIS H. MERINO
BY Max E. Shirk
ATTORNEY

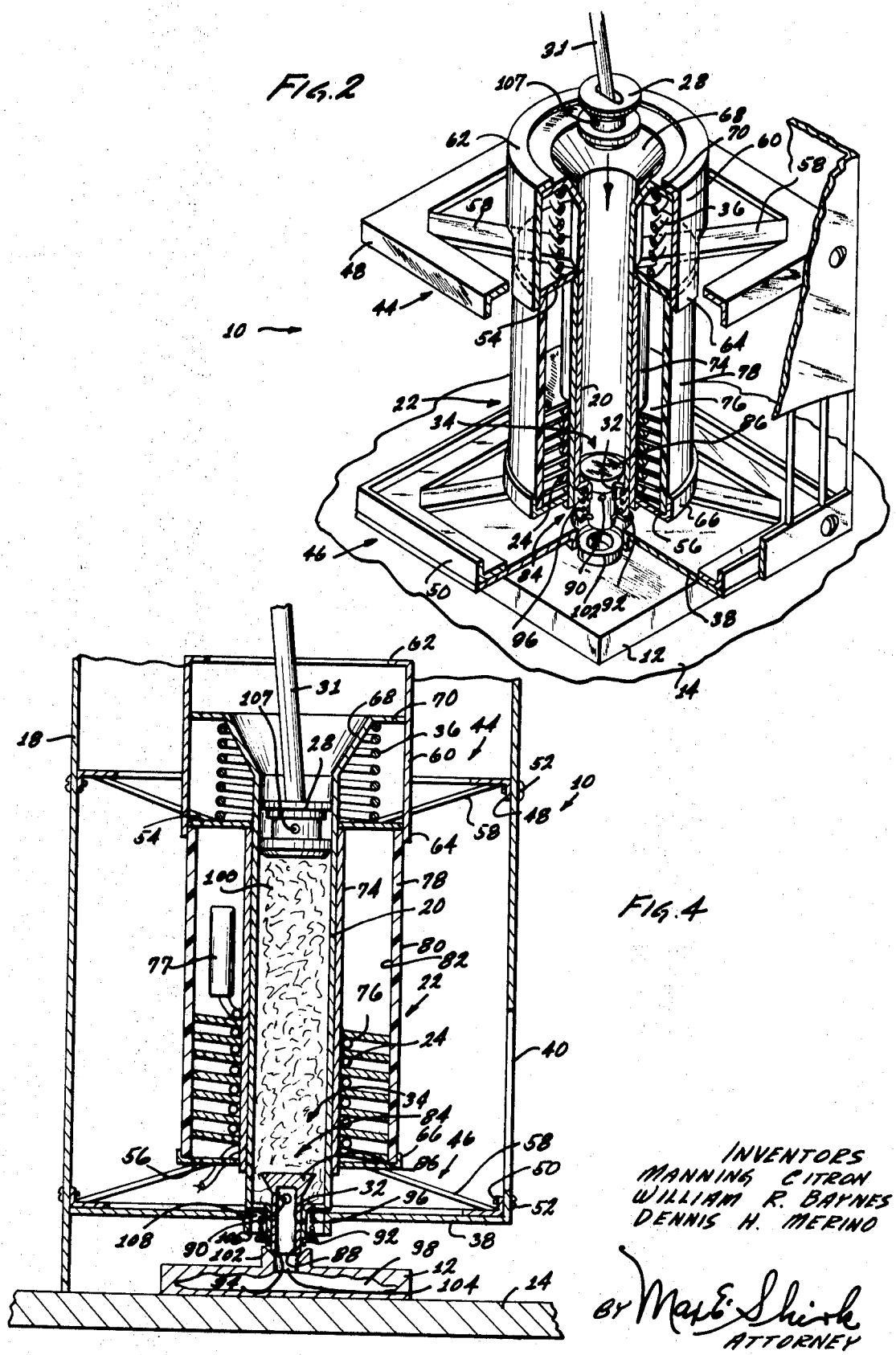

INVENTORS
MANNING CITRON
WILLIAM R. BAYNES
DENNIS H. MERINO

BY Max E. Shirk
ATTORNEY

Patented April 13, 1971
3,574,897
4 Sheets-Sheet 4
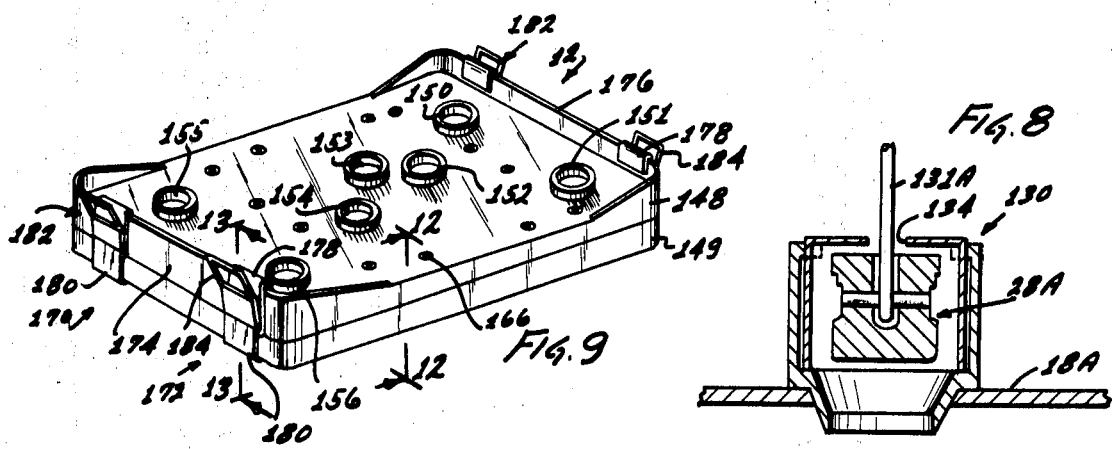
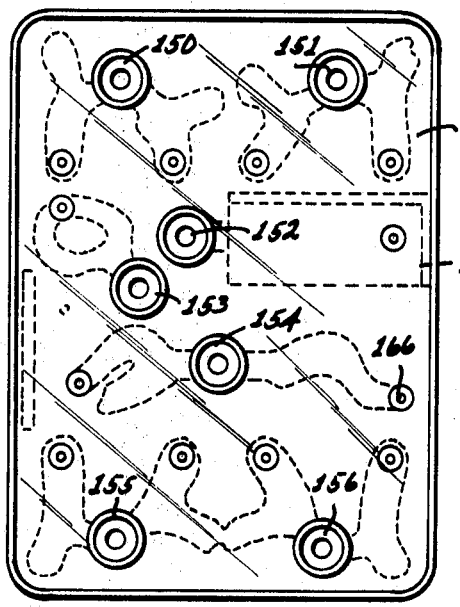
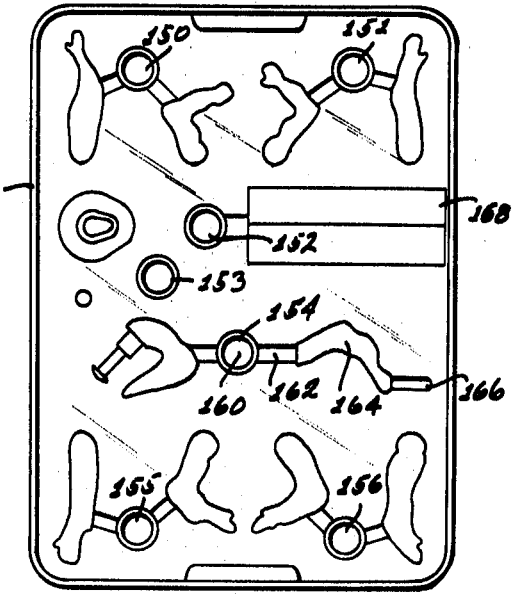
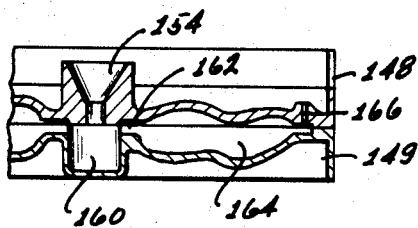
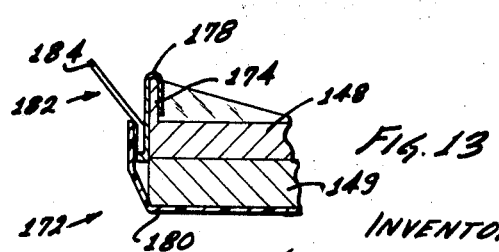
INVENTORS
MANNING CITRON
WILLIAM R. BAYNES
DENNIS H. MERINO
BY Max E. Shirk
ATTORNEY

INJECTION-MOLDING APPARATUS

BACKGROUND OF THE INVENTION

1. Field of the Invention

This invention relates to injection-molding apparatus, including molding machines and molds.

2. Description of the Prior Art

Injection-molding machines typically include a heated cylinder which contains a charge of plastic or the like, and a ram or piston for expelling the heated plastic through a nozzle into a mold. Both the cylinder and the nozzle may be at a high temperature such as 400° F. to 500° F., and contact with them can cause a painful burn. A guard can be easily placed around the hot cylinder, but it is difficult to continue the guard down to the hot nozzle since the nozzle must contact the mold. Thus, there is a likelihood that a child or even an adult amateur operator will burn himself while placing the mold under the nozzle.

In addition, injection-molding machines have generally been complicated, requiring operation of a lever to move the cylinder nozzle against the mold, and operation of a separate lever to press down the piston which forces plastic out through the nozzle. A simple and safe injection-molding machine, that was suitable for use by amateur operators, would find many uses ranging from hobby and workshop applications to toys. Improved molds for use with such machines would also find wide use.

OBJECTS AND SUMMARY OF THE INVENTION

An object of the present invention is to provide a simple, safe, and easily operated injection molder.

Another object is to provide an improved piston for injection-molding apparatus.

Still another object is to provide an efficient mold for injection molding.

In accordance with the present invention, injection-molding apparatus is provided that includes a frame which carries a heated cylinder that is biased upwardly. The cylinder has a valve at its bottom that leads to a thin-walled nozzle through which hot plastic or other molding material is dispensed. A piston that projects into the cylinder can be pressed down to move down the cylinder, so that the nozzle is moved against a sprue hole in a mold. Further force on the piston moves down the cylinder while the nozzle remains stationary by reason of abutment with the mold, to thereby open the valve and force the molding material through the nozzle into the mold.

A protective cover surrounds the cylinder, and also surrounds the nozzle until the nozzle is moved down against a mold. The entire molding operation is performed by merely pressing on a lever that operates the piston. The nozzle is exposed only during such piston operation, and it returns behind the protective cover when the piston lever is released. In addition, the nozzle is thin-walled and therefore of low heat capacity, so it cannot transfer large amounts of heat to a hand which accidentally touches it, thereby preventing bad burns.

The piston which moves in the cylinder is constructed of a thermoplastic material with fibers therein, such as Teflon with glass fibers. The piston is manufactured slightly oversize, and the hot cylinder walls size it to an extremely close fit the first time it is pushed into the cylinder.

The invention also provides molds for use with the injection-molding machine, to facilitate the molding operation and assure better molded parts. Purging wells in the molds are provided to trap the first-injected molding material, which may represent the remainder from a previous charge of material left in the cylinder and therefore may be of another color from the new charge in the cylinder. A gate in the mold leads from the top of the well to the main cavity to allow only later portions of material to fill the main cavity. A narrow riser passageway leads from the top of the main cavity to the outside of the mold, to allow the escape of molding material after the cavity fills. The escape of material notifies the operator that the cavity is filled.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of an injection-molding machine constructed in accordance with the invention;

FIG. 2 is a perspective view of the molding machine of FIG. 1 with portions thereof cut away;

FIG. 3 is a side elevation view taken on the line 3–3 of FIG. 1, prior to lowering the cylinder for expelling molding material;

FIG. 4 is a side elevation view similar to that of FIG. 3, but with the cylinder lowered to expel molding material into a mold;

FIG. 5 is a perspective view of a heat insulator constructed in accordance with another embodiment of the invention, suitable for the molding apparatus of FIG. 1;

FIG. 6 is a plan view of a strip of material for forming the insulator of FIG. 5;

FIG. 8 is a sectional view taken on the line 8–8 of FIG. 7;

FIG. 9 is a perspective view of a mold constructed in accordance with an embodiment of the invention;

FIG. 10 is a plan view of a mold half of the mold of FIG. 9;

FIG. 11 is a plan view of a lower half of the mold of FIG. 9;

FIG. 12 is a sectional view taken on the line 12–12 of FIG. 9; and

FIG. 13 is a sectional view taken on the line 13–13 of FIG. 9.

DESCRIPTION OF THE PREFERRED EMBODIMENTS

Figure 7:
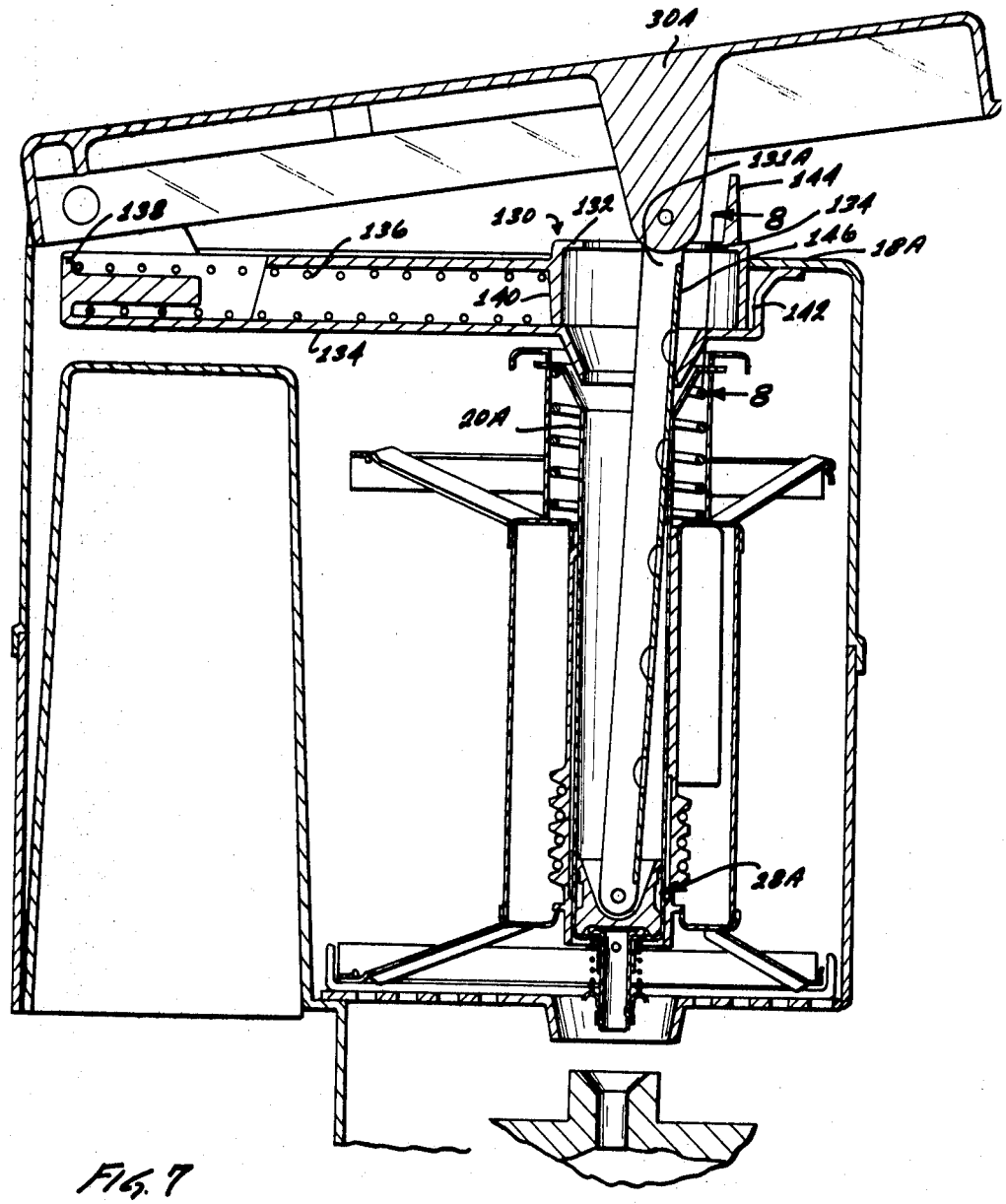
FIG. 7 is a sectional side view of a molding machine constructed in accordance with another embodiment of the invention.

FIGS. 1 and 2 illustrate an injection-molding machine 10 constructed in accordance with the invention for filling a mold 12. The machine includes a stand with a base 14 for holding the mold and a column 16 extending upwardly from one side of the base, and also includes a housing 18 mounted on the column. A container or cylinder 20 is mounted in the housing, to hold plastic or other material which is to be injected into the mold 12. The cylinder and its contents are surrounded by a heating assembly 22 which includes a resistance wire 24 that is coupled to a cord 26 which can be plugged into an ordinary household wall socket. A piston 28 within the cylinder 20 can be pressed down by force applied to a lever 30 and transmitted through a rod 31 to the piston, to cause ejection of the heated molding material from the cylinder into the mold.

The cylinder 20 has an ejection end 32 of reduced diameter. A nozzle and valve means 34 is disposed at the ejection end for opening and closing off the outflow of molding material, and for directing it into the mold 12. The cylinder 20 is biased upwardly by a spring 36. When the piston 28 is pushed down, the cylinder with the valve means 34 at its lower end moves down against the bias of spring 36. If a mold 12 has been placed beneath the cylinder, the valve means will abut the mold, and cannot move down any further. Further downward pressure on the piston causes the cylinder to move down further, while the valve means is restrained from such movement, which causes the valve to open. Molding material then flows out the valve means, under the continued force on the piston, to fill the mold 12.

Prior to the application of downward force on the piston 28, when the cylinder 20 is in its upward position, the bottom of the valve means 34 is at a level above protective bottom cover 38 that is mounted at the bottom of the housing 18. The cover 38 prevents accidental contact of a human operator with the hot valve means, particularly when the operator is placing a mold under the cylinder. Operation of lever 30 controls downward movement of the valve means together with the cylinder, which enables simple close control to assure alignment of the valve means end with the opening of the mold 12.

A viewing aperture or opening 40 at the front of the housing 18 facilitates observation of the valve means to assure that it seats on the mold. Several bars 42 are placed in the opening to reduce the likelihood of the operator touching the heated inner mechanism.

FIG. 3 shows the molding apparatus with the cylinder in an upward position. A pair of support brackets 44 and 46 support the operating mechanism on the housing 18, while minimizing the transfer of heat from the mechanism to the housing. Each bracket has a perimeter portion 48, 50 that is fastened to the housing by screws 52, and an inner portion 54, 56 that is tied to its perimeter portion by four bars 58. A frame 60 that is fixed to the inner portion 54 of the upper bracket, has an inwardly formed flange 62 at its top for limiting upward movement of the cylinder, and an overhanging portion 64 at its bottom for retaining the bracket 54 and the heating assembly 22. The inner portion 56 of the lower bracket supports the heating assembly 22, and a turned-up rim 66 thereon helps to retain it in place.

The cylinder 20 has a flared upper portion 68 with an outwardly extending flange 70. The spring 36 extends between the cylinder flange 70 and the inner portion 54 of the upper flange to bias the cylinder in an upward direction. The cylinder is guided in vertical movement by an inner tubular wall 74 of the heating assembly 22.

The heating assembly 22 comprises the tubular wall 74 which has a helical portion 76 thereabout. The helical portion supports the resistance wire 24, and helps to transmit heat from the wire to the tubular wall 74 and thence to cylinder 20 to melt the molding material therein. A temperature sensor 77 within the heating assembly opens and closes the resistance wire circuit to maintain the apparatus at a predetermined temperature. The helical portion 76, which supports the resistance wire, also helps to fix the position of an outer tubular heat insulator 78 which surrounds the heating assembly. The insulator 78 has substantially lower temperature on its outer surface 80 than on its inner surface 82. This offers additional protection against burning the operator. Even though the outer surface 80 of the insulator is shielded from the operator by the housing 18, it is still possible for the operator to reach inbetween the bars 42 to touch the insulator, or to remove a housing portion to expose the insulator while it is hot. The insulator also reduces heat losses that would hamper the rapid attainment of the elevated cylinder temperatures which are required.

The nozzle and valve means 34 is formed by a member 84 which has a flared upper end 86 and a thin-walled hollow stem 88. Several holes 90 are formed radially in the stem wall just below the flared upper end, for receiving molding material when the member 84 is pushed up relative to the cylinder 20. A spring-retaining member 92, which may be a grommet staked to the stem of the member 84, is positioned at a distance from the lower or outer end 94 of the hollow stem. A valve spring 96 is disposed between a lower wall of the cylinder and the retaining member 92, to bias the member 84 downwardly with respect to the cylinder. The member 84 is free to move up and down, while guided by the ejection end 32 of the cylinder and biased downwardly by the spring 96.

The mold cavity 98 of a mold 12 can be filled with molten molding material 100 in the cylinder by placing the mold on the base 14 of the apparatus. The mold is positioned so that the walls 102 of its sprue hole 104 lie directly below the lower end 94 of the valve member. Downward force is applied to the piston-operating handle 30, the force being applied through the rod 31 which is pivotally coupled at 107 to the piston 28, to force the piston down against the molding material 100. The downward force on the molding material is transmitted to the cylinder, to move it down against the bias of spring 36. As the cylinder moves down, the valve and nozzle member 84 moves down until its lower end abuts the sprue hole walls 102 of the mold. The cylinder can continue to move downward, but the member 84 is stopped, so it moves up relative to the cylinder, against the biasing of valve spring 96. The apparatus is then in the configuration of FIG. 4.

As shown in FIG. 4, upward movement of the member 84 to an inward position brings the holes 90 into communication with the cylinder so the hollow stem can receive the molding material 100 in the cylinder. The pressure still being applied to the molding material forces it through the holes 90, so it flows through the hollow stem 88, and through the sprue hole walls 102 to fill the mold cavity 98. When the operator judges that the mold cavity is filled, he stops pressing down on the operating lever 30. This allows the cylinder spring 36 to raise the cylinder, and the valve spring 96 to move the member 84 down relative to the cylinder. The flared valve portion 86 can then seat upon the cylinder walls around its lower opening to prevent leakage of molding material, while the holes 90 in the stem are sealed off from the cylinder so they no longer can receive molding material to dispense it through the lower end of the valve and nozzle member.

The preparation of the apparatus for molding involves connection to a household electrical outlet, and dropping some molding material into the cylinder 20 through its upper end. The molding material may be provided in the form of short cylinders, so several of these can be dropped in to fill up the cylinder to a level somewhat below its flared portion. Filling of the cylinder is accomplished while the piston 28 is completely withdrawn from the cylinder. As the cylinder heats up, the mold 12 is placed on the base, and the piston may be reinserted into the cylinder. When molding temperature is reached, which may be indicated by termination of glow of a lamp (not shown) in series with the resistance-heating wire, the molding operation, described above, can begin.

Several precautions are taken to further reduce the chance of burning the operator. The protective cover 38 which prevents the operator from touching the hot valve and nozzle member 84, has a collar portion 106 about the aperture 108 through which the member 84 moves. If the operator moves his hand under the cover 38, he will sense the collar portion, which will warn him not to project his finger through the aperture 108.

It is still possible for the operator to touch the hot valve member 84, either by projecting his finger through the aperture 108, or by moving his hand under the housing when the cylinder has been lowered. To prevent severe burns, the stem 88 of the valve member is constructed of thin-walled material. For example, in a valve member stem of approximately ⅛-inch diameter, walls of 0.02-inch thickness have been employed. The thin walls have a low heat capacity, so they are quickly cooled when contacted by a hand, and cannot transfer enough heat to cause more than a superficial burn. In order to prevent a sever burn, stem walls of commonly used material such as steel should be no more than about one-twentieth of an inch in thickness at the lower end portion.

The cover 38 which guards the hot valve and nozzle means is constructed of transparent material. This allows the operator to observe the seating of the lower end 94 of the stem on the sprue hole walls 102 of the mold, so he can shift the mold position slightly to make sure of good seating. The observer looks through the aperture 40 at the front of the housing and through the bottom cover 38 to observe the seating of the stem on the mold.

The piston 28 which moves through the cylinder, must form a very close fit with the cylinder walls. This is to prevent leakage of the molding material around the piston when it is pressed down hard. Ordinarily, this would require manufacturing the cylinder and piston to very close tolerances. This would result in a substantially increased cost of manufacture for simple molding machines suitable for amateur hobbyists or children.

In accordance with the invention, the piston 28 is constructed of a material which is heat sizable at a temperature on the order of 500° F., which is a typical temperature used in injection molding of plastic materials. In addition, the piston is manufactured to a size which provides an interference fit with the cylinder 20. The first time that the piston is pushed down into the cylinder 20, which has been heated, the cylinder hot sizes the piston to the proper size for that cylinder. A thermoplastic material can be used for the piston, a material composed of Teflon with glass fibers having been found very satisfactory for this purpose.

Economical piston and cylinder assemblies have been formed for pistons of approximately -inch nominal diameter. The cylinders were produced with tolerances in inside diameter of ±0.0015 inch. The pistons were constructed with tolerances of ±0.001 inch about a nominal diameter that assured an interference fit of 1 to six-thousandths of an inch. (i.e., the clearance between the largest cylinder and smallest piston was −0.001 while the clearance between the smallest cylinder and largest piston was −0.006). The cylinders were constructed of aluminum to provide high heat conductivity while the pistons were constructed of Teflon with glass fibers. The pistons were hot sized by the first pass into the cylinder, and thereafter did not leak. The axial compression of the piston by reason of downward force applied thereto by the operating handle and upward force exerted by the molding material, tends to expand the cylinder to a slightly greater diameter, which also prevents leakage.

The use of embedded higher-temperature melting solids, such as fibers, in the thermoplastic matrix has been found to provide an additional benefit. The solids have been found to burnish the cylinder walls, which prevents leakage over a long period of use. Other materials such as molybdenum flakes in a Teflon base material provide the same effect.

FIG. 5 illustrates an insulating cylinder 110 which can be used in place of the insulator 78 to achieve a large drop in temperature. The cylinder 110 comprises a strip of insulating material wound to form a cylinder of three layers. The inner layer 112 and outer layer 114 are smooth, but the central layer 116 is corrugated to space the inner and outer layers from each other. The strip is in a form shown in FIG. 6 prior to winding, with a flap 118 at one end which is to be part of the outer layer and a slot 120 formed to receive the flap. The opposite end has a notch 122, where a flap from another strip was formed in the course of manufacturing. A material such as a polyamd or polyimid can be used to provide good insulation.

FIGS. 7 and 8 illustrate another embodiment of the invention which is similar to the molding machine described above except that it includes a piston-shifting mechanism 130 for preventing the removal of the piston 28A from the housing. This is to prevent burns which can occur if the operator removes a hot piston from the cylinder 20 and touches it. The piston-shifting mechanism includes a piston-receiving member 132 that is mounted to slide back and forward. A rod 131A that connects the piston and handle 30A extends through a narrow slot 134 in the piston-receiving member. The slot is narrower than the piston 28A, to prevent removal of a hot piston from the housing. Access to the cylinder 20A to add more molding material, is obtained by lifting the piston until it is within the receiving member 132, and then shifting the member backward to expose the open top of the cylinder. The piston rides backward with the piston-receiving member so it is out of the way of the cylinder.

The piston-receiving member 132 is slideably mounted on a guide 134 that is fastened to the top of the housing 18A. A spring 136 extending between a wall 138 of the guide and a back wall 140 of the piston-receiving member bias the member 132 toward a forward position. A forward wall 142 on the guide limits the forward movement of the member 132 to a position over the cylinder 20A. A tab 144 on the piston-receiving member is provided to enable the operator to move the member backwards to uncover the cylinder. In order to reduce the likelihood of burning if the operator's finger should slip off the tab 144, the rod is provided with a covering 146 at its forward side, that is of low heat conductivity.

FIGS. 9 through 13 illustrate details of the mold 12 which can be filled by the molding apparatus of the invention. The mold, which includes upper and lower halves 148, 149, provides cavities for parts that can be assembled into a toy figure. The mold has seven different sprue holes 150 through 156, for filling seven different cavities. This allows a child to use different colors of plastic for different parts. For example, the arms and legs of a figure may be flesh colored, but the clothes are preferably molded of another color. The separate cavities also allow different quantities of different parts to be formed. One of the cavities 158 can form a cylinder of material for recharging the molding machine. This cavity is used to receive excess material in the molding machine, the solid rod shape being a convenient form of storage.

As shown particularly in FIG. 12, the sprue hole 154 leads to a purging well 160 in the lower mold half. A gate 162 leads from an upper portion of the purging well to the cavity 164 which defines a toy part, the cavity being formed by depressions in adjacent surfaces of the mold halves 148, 149. A riser passageway 166 leads upwardly from the cavity through the upper mold half. The function of the purging well 160 is to trap the first portion of plastic that enters the mold, and prevent it from entering the cavity 164 where the toy part is formed. Purging is desirable when the color of the plastic in the molding machine is changed. Generally, a small quantity of the old plastic remains in the machine, and this residue is the first portion to be dispensed. When the residue portion is injected through sprue hole 154, it falls to the bottom of the purging well 160. Only after some of new plastic has been injected, does the well fill up so plastic can begin to flow through the gate 162 into the cavity 164. The size of the purging well 160 is chosen so that it stores slightly more than the amount of residue which remains in the cylinder 20 of the molding machine when the piston 28 is pushed down to its lowest level.

The injection of plastic molding material continues until the entire part cavity 164 is filled and the plastic rises through the riser, or outlet passageway 166. When the operator observes a ball of plastic at the top of the passageway 166, he stops injecting molding material into the mold. The mold halves are typically constructed of an opaque material such as a zinc alloy, so the operator ordinarily could not tell when the cavity 164 was filled. If the cavity were closed off, the injection of additional plastic material would lead to the leakage of material between the mold halves, which results in flashing on the molded part. The riser passageway 166 not only serves to vent excess plastic injected into the mold, but visually indicates when injection should top. The riser passageway is preferably of a small diameter, usually less than the diameter of the gate, to assure complete filling of the cavity before material rises in the riser passageway. In addition to serving as a vent for excess plastic and as an indicator of complete cavity filling, the risers can also serve to hydraulically balance a system where multiple cavities are being simultaneously filled.

When all of the parts to be molded have been formed, the excess molding material is injected through sprue hole 152 into the rod cavity 158. The molding material is very viscous, so that generally a rod shape if formed in the cavity 168, with a length that varies in accordance with the amount of injected material. The rod has a cross section which is approximately the same as that of the cylinder 20 of the molding machine, which in generally cylindrical. When the molded rod is dropped into the cylinder, the large area of contact between it and the cylinder inner walls results in rapid heating of the rod of molding material. In addition to faster reheating in the cylinder of the molding machine, the rod provides a convenient form for compact storage.

The mold halves 148, 149 must be held together tightly to resist the separating forces that are present during injection. Heretofore, this has generally been accomplished with several screws that project into the halves. In accordance with the invention, a pair of strap fasteners 170, 172 are provided which extend between opposite sides of the mold. The upper mold half has upwardly extending flanges 174, 176 at opposite sides, or ends and the strap fasteners have hooks 178 that engage the flanges. Straps 180 extend across the bottom of the mold and are attached to hooks 178 by tighteners 182. As shown in FIG. 13, the tighteners are overcenter types with levers 184 that can be pivoted up to tighten the straps 180, or pivoted down to loosen the mold halves. The fasteners can be operated quickly and without tools, which enables the rapid operation of the molding apparatus.

Thus, the invention provides simple injection-molding apparatus which is economical to make and both safe and easy to operate. Although particular embodiments of the invention have been described and illustrated herein, it is recognized that modifications and variations may readily occur to those skilled in the art, and consequently, it is intended that the claims be interpreted to cover such modifications and equivalents.

We claim:

1. Apparatus for injection molding of material into a mold comprising:
   cylinder means for holding said molding material, including upper and lower end portions;
   means for guiding said cylinder means substantially in up and down motion;
   means for upwardly biasing said cylinder means;
   nozzle means mounted on said lower end portion of said cylinder means for substantially up and down movement with respect to said cylinder means, said nozzle means including means alternately communicating with and sealed off from the inside of said cylinder means when said nozzle means is moved to upward and downward positions, respectively, with respect to said cylinder means;
   means for biasing said nozzle means downwardly with respect to said cylinder means;
   piston means for movement downwardly into said cylinder means;
   means for applying downward force to said piston means comprising a handle and a rod connecting said handle to said piston means;
   a piston-receiving member having a slot through which said rod extends, said slot being smaller than said piston means to prevent the removal of said piston means therethrough; and
   means for guiding said piston-receiving member between a first position over said cylinder means and a second position spaced from said first position to uncover said cylinder means.

2. Apparatus for injection molding of material into a mold comprising:
   cylinder means for holding said molding material, including upper and lower end portions;
   means for guiding said cylinder means substantially in up and down motion;
   means for upwardly biasing said cylinder means;
   nozzle means mounted on said lower end portion of said cylinder means for substantially up and down movement with respect to said cylinder means, said nozzle means including means alternately communicating with and sealed off from the inside of said cylinder means when said nozzle means is moved to upward and downward positions, respectively, with respect to said cylinder means;
   means for biasing said nozzle means downwardly with respect to said cylinder means;
   piston means for movement downwardly into said cylinder means;
   means for applying downward force to said piston means; and
   cover means disposed at a level below said nozzle means when said cylinder and nozzle means are in upward positions, said cover means having an aperture for passing a lower portion of said nozzle means when said cylinder means moves down.

3. Apparatus for injection molding of material into a mold comprising:
   cylinder means for holding said molding material, including upper and lower end portions, said cylinder means comprising walls defining an elongated chamber of circular cross section;
   means for guiding said cylinder means substantially in up and down motion;
   means for upwardly biasing said cylinder means;
   nozzle means mounted on said lower end portion of said cylinder means for substantially up and down movement with respect to said cylinder means, said nozzle means including means alternately communicating with and sealed off from the inside of said cylinder means when said nozzle means is moved to upward and downward positions, respectively, with respect to said cylinder means;
   means for biasing said nozzle means downwardly with respect to said cylinder means;
   piston means for movement downwardly into said cylinder means, said piston means being constructed of a thermoplastic material with an initial diameter larger than the inner diameter of said cylinder means, for hot sizing to a close fit with said cylinder walls;
   means for applying downward force to said piston means; and
   means for heating said cylinder means to an elevated temperature.

4. Injection-molding apparatus comprising:
   a stand having a base for supporting a mold;
   a housing mounted on said stand above said base;
   a cylinder mounted on said housing for movement toward and away from said base;
   means for biasing said cylinder away from said base;
   a piston for moving down in said cylinder;
   means for moving said piston down in said cylinder;
   valve means slideably mounted at the lower end of said cylinder for up and down movement, including a hollow stem with an open lower end for discharging molding material into a mold and an upper end with an aperture for receiving molding material from said cylinder only when said stem is in an upward position;
   means for biasing said valve means downwardly with respect to said cylinder; and
   piston-receiving means mounted on said housing for movement between a first position over said cylinder and a second position spaced from said first position, said piston-receiving means having an opening, said means for moving said piston comprising a handle and an elongated member extending through said opening in said piston-receiving means, with one end attached to said handle and an opposite end attached to said piston.

5. The apparatus described in claim 2 wherein said cover means is transparent, whereby to enable observation of seating of said nozzle means on a mold.

6. The apparatus described in claim 1 wherein said nozzle means includes a hollow stem with a lower end portion, said lower end portion having walls which are less than one-twentieth of an inch in thickness, whereby to prevent severe burns when said lower end portion is touched while it is an elevated temperature.

7. The apparatus described in claim 3 wherein said thermoplastic material includes numerous small pieces of a material that is solid at a temperature when said thermoplastic material is hot sizable.

8. The apparatus described in claim 3 including a multiplicity of glass fibers dispersed in said thermoplastic material.

9. The apparatus described in claim 1 including heating means disposed about said cylinder means, said heating means including a cylindrical insulator that comprises a layer of corrugated insulating material sandwiched between a pair of layers of insulating material.

10. The apparatus described in claim 4 including:
    means for heating said cylinder; and
    a protective cover mounted below said cylinder, said cover having an aperture for allowing the passage of said stem of said valve means.